United States Patent Office 3,202,207
Patented Aug. 24, 1965

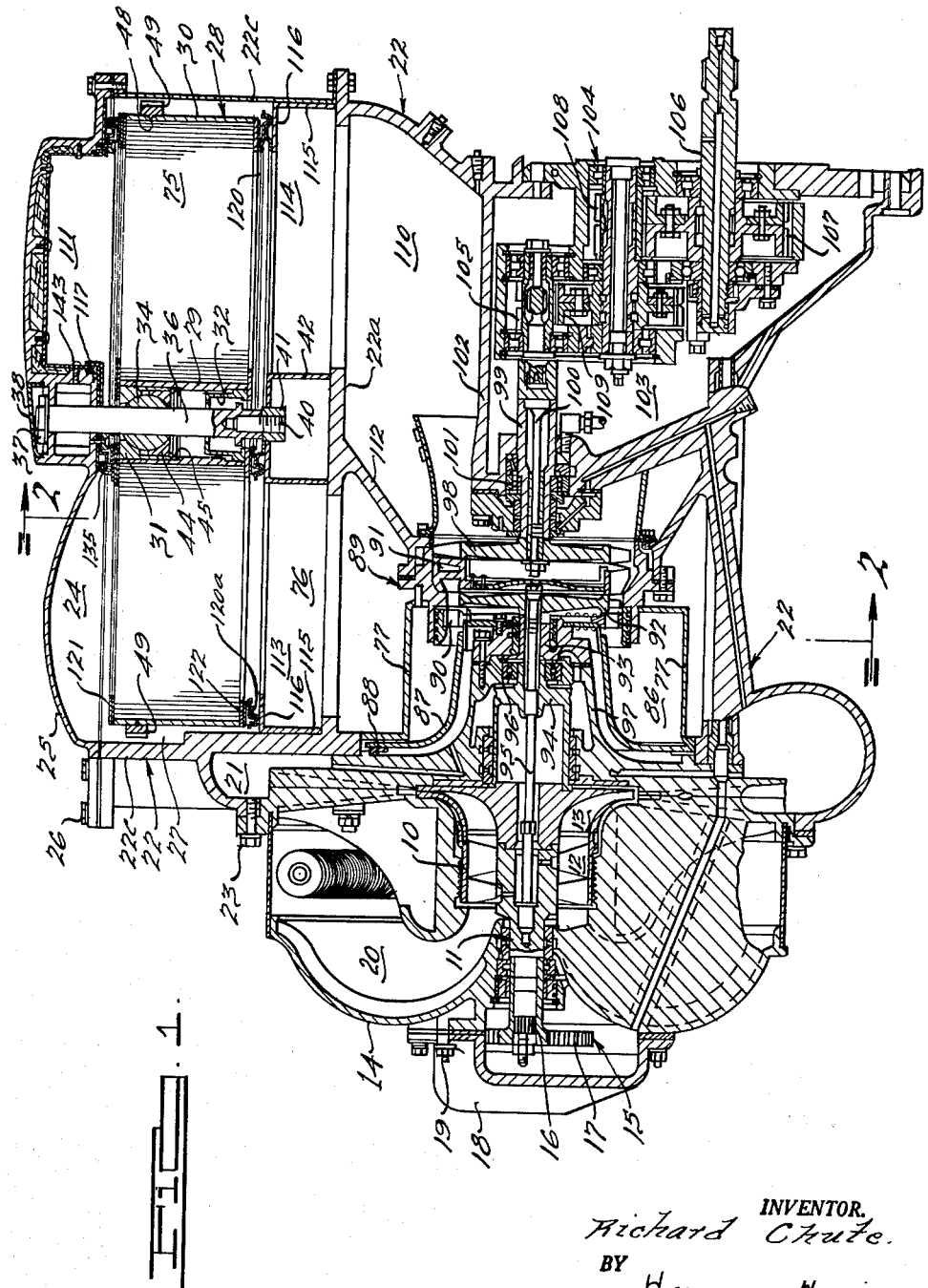

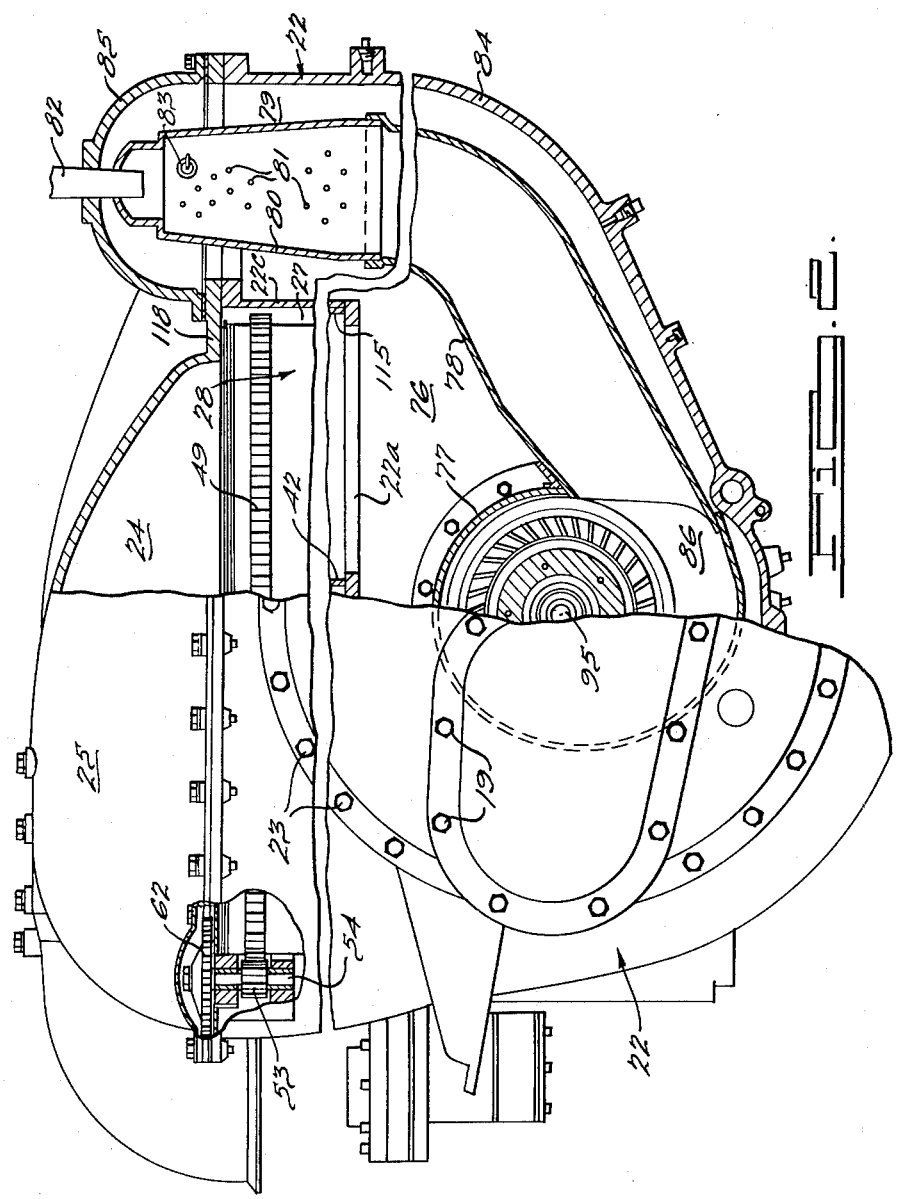

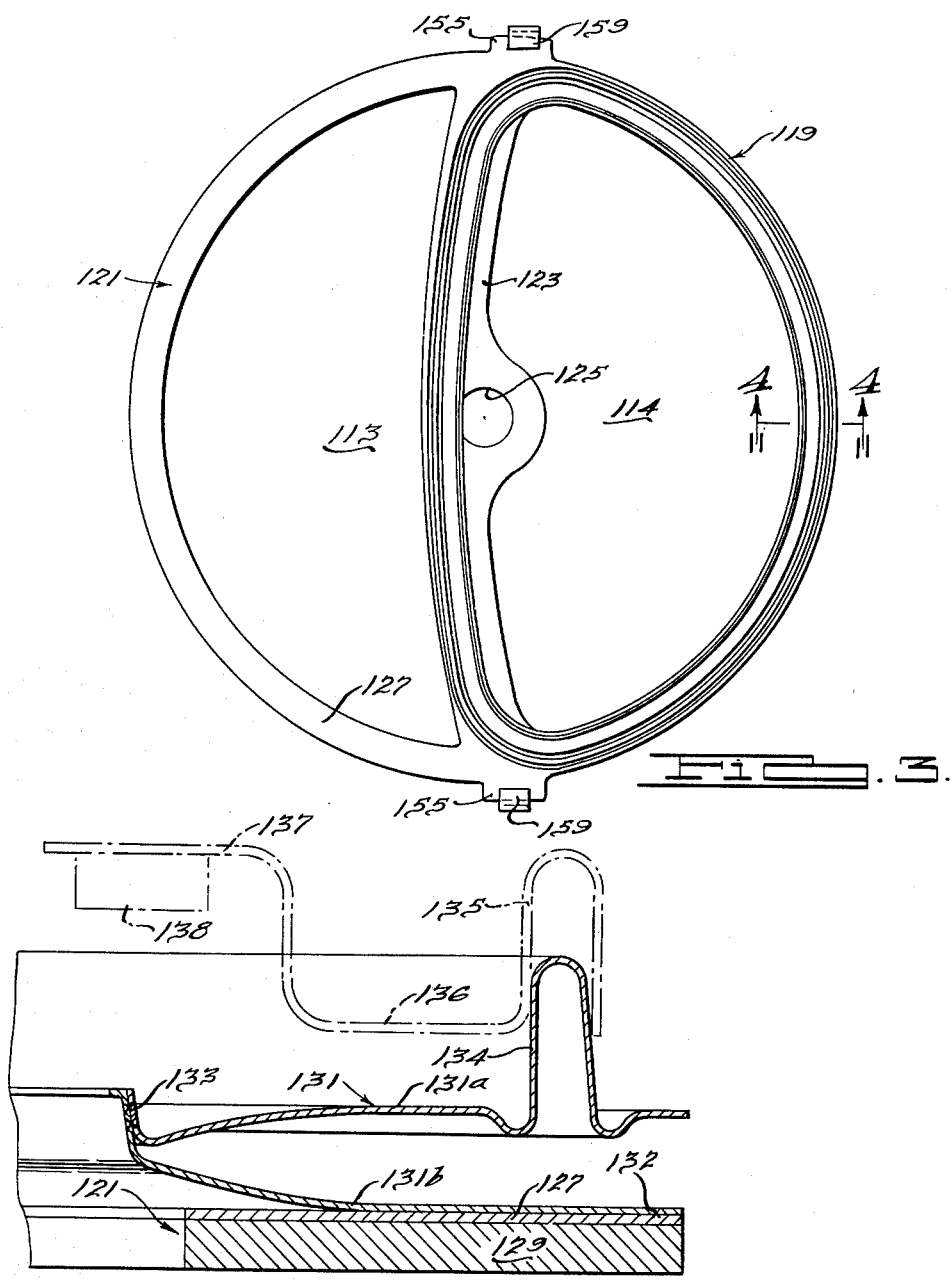

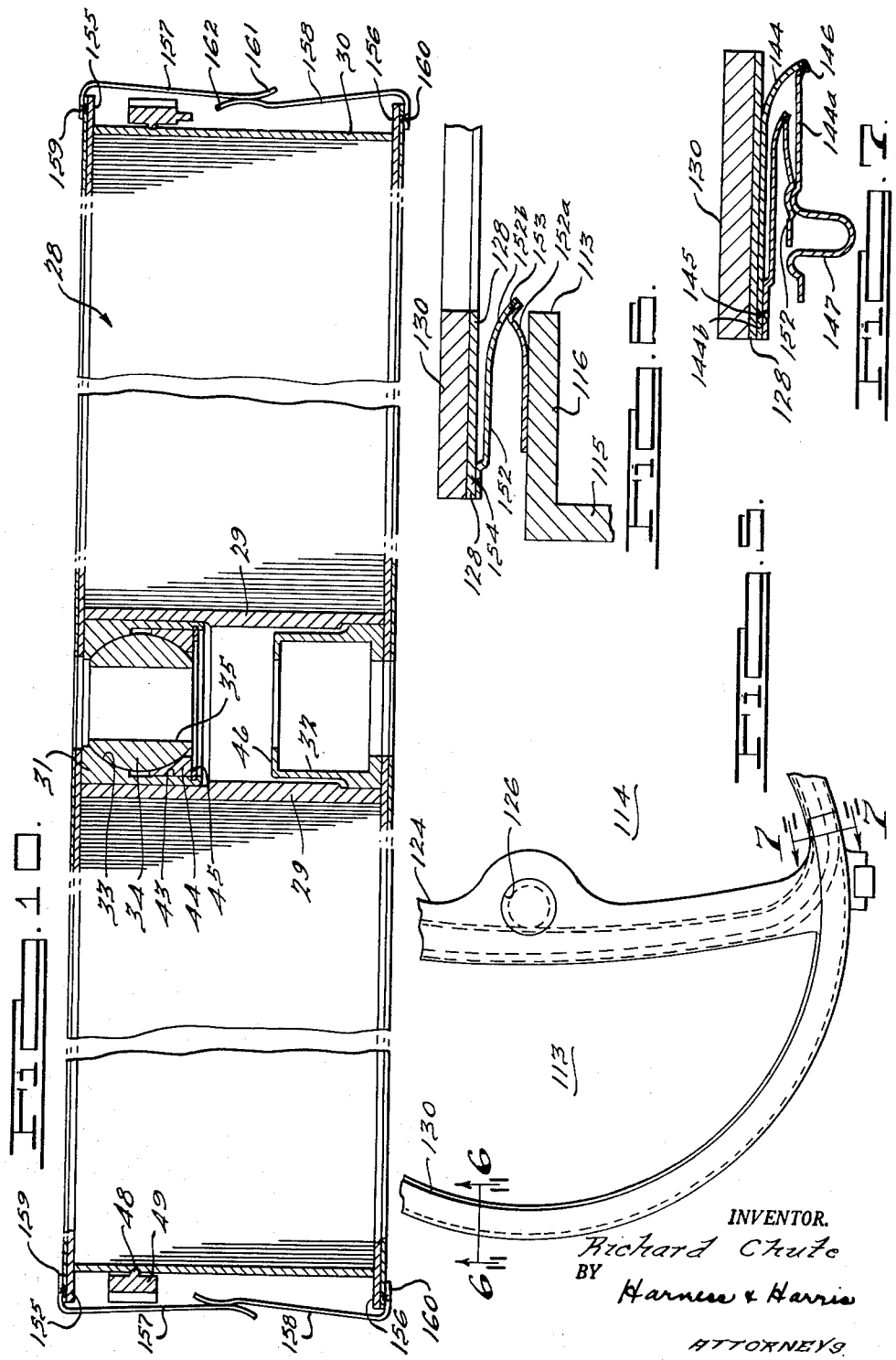

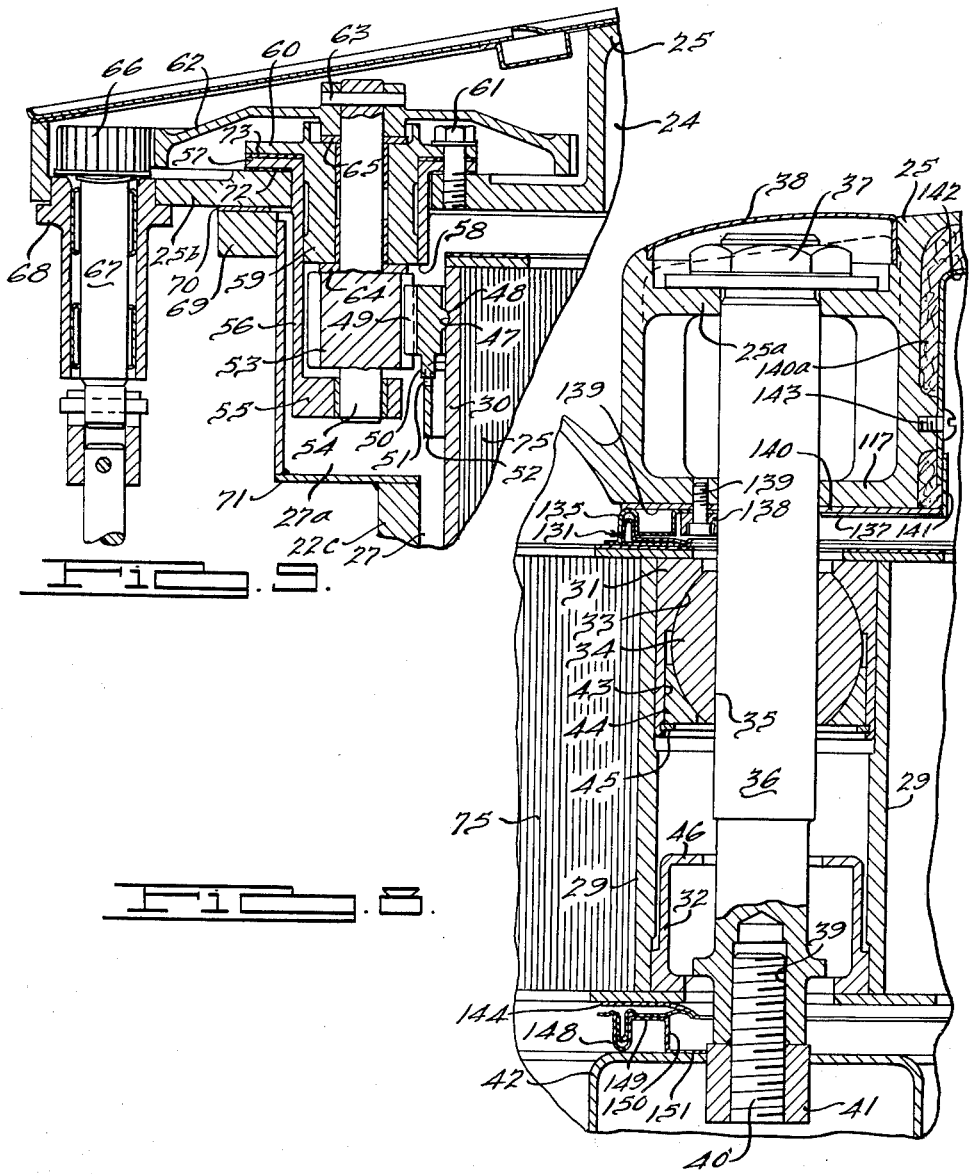

3,202,207
ROTARY REGENERATOR SEALING STRUCTURE
Richard Chute, Huntington Woods, Mich., assignor to Chrysler Corporation, Highland Park, Mich., a corporation of Delaware
Filed Dec. 2, 1960, Ser. No. 73,266
10 Claims. (Cl. 165—9)

This invention relates generally to gas turbine power plants or other fuel combustion apparatus and to rotary regenerator mechanisms for use therewith. More particularly, the invention is concerned with a new and improved means for sealing rotary regenerator mechanisms to eliminate undesirable bypassing of the gases flowing through separate portions of the regenerator matrix, the gases flowing through one matrix portion being at a different temperature and pressure than the temperature and pressure of the gases flowing through the other portion, and the temperature and pressure of the gases flowing through both portions being different than the temperature and pressure of the gases surrounding the regenerator matrix.

Although the sealing structure of the present invention is capable of being used with a large variety of different fuel combustion apparatus employing a regenerative combustion cycle, one preferred structural environment is disclosed which comprises a compact gas turbine power plant of the automotive type, the regenerator structure therefor including a circular matrix which is rotatably mounted about a central hub portion. The circular regenerator matrix in the disclosed power plant structure is mounted within a cast power plant frame or housing which encloses other component elements of the power plant. These other component elements of the power plant include a rotary compressor which is capable of receiving fuel combustion supporting air through suitable intake air ducts extending to the exterior of the power plant housing. The compressor discharges the intake air at an increased total pressure into a suitable diffuser structure which conducts the comparatively cool and high pressure air to an air intake chamber defined by the upper portion of the cast housing structure, said diffuser effecting a reduction in the velocity pressure of the compressed intake air and an increase in the static pressure.

The regenerator matrix structure may be disposed within the above mentioned intake chamber in adjacent relationship therewith and the compressed intake air may pass through sector-like openings formed in the power plant housing on either side of the regenerator matrix and through a first portion of the regenerator matrix into a passage means communicating with the fuel combustion chamber, the passage of pressurized intake air through said regenerator being confined to said first matrix portion. Also the entire circumference of the regenerator is advantageously bathed in the aforesaid cool and high pressure discharge air entering said air intake chamber from the compressor.

Liquid fuel may be mixed with the air in the fuel combustion chamber and the high temperature gases produced by the fuel combustion process are conducted through suitable baffling to an annular gas passage within which the bladed peripheries of a two-stage turbine wheel assembly are disposed, the turbine wheels associated with the separate turbine stages being disposed in a central portion of the power plant housing. The turbine wheel associated with the first turbine stage is drivably coupled to the rotary compressor unit, above described, and the turbine wheel associated with the second turbine stage is drivably connected to the power input member of a speed reduction transmission, said transmission also being mounted within the power plant housing to form a complete, compact automotive power plant. Each of the turbine wheels is powered by the motive gases passing through the annular gas passage. A suitable drive means may be provided for drivably coupling the first turbine stage with the rotary regenerator matrix to impart a rotary motion to the latter during operation of the power plant.

The high temperature combustion gases are exhausted into a chamber within the power plant housing, said chamber being situated below a second rotary regenerator matrix portion at a location which is displaced from the aforementioned first regenerator matrix portion. Second sector-like openings are formed in the power plant housing on either side of the regenerator matrix and are adapted to accommodate the passage of the hot combustion exhaust gases through said second matrix portion into an exhaust chamber defined by the upper portion of the power plant housing, said exhaust chamber communicating with a suitable exhaust gas outlet passage.

The hot exhaust gases are effective to heat the second regenerator matrix portion to an elevated temperature and as the matrix portion is rotated about its central axis, the heated portion is brought into contact with the relatively cool compressed intake air to effect a transfer of thermal energy from the hot to the cool gases. When the same matrix portion is again brought into contact with the heated exhaust gases upon continued rotation of the regenerator, a transfer of thermal energy again takes place from the exhaust gas to the matrix structure and the temperature of the latter again rises as the cycle is repeated. The regenerator matrix thus serves as a vehicle for transferring thermal energy from the hot combustion exhaust gases to the relatively cool compressed intake air, and the thermal efficiency of the power plant is correspondingly increased.

In consequence of the continual temperature and pressure changes to which the regenerator matrix is subjected, the matrix tends to warp and give rise to difficult sealing problems in the effort to prevent an undesirable and wasteful bypassing or short-circuiting of the gases as they are conducted through the above-described circuit during operation.

In addition, optimum heat transfer efficiency in a regenerator of the above character requires a counterflow arrangement wherein the comparatively cool high pressure air from the compressor passes in one axial direction through one sector of the regenerator matrix and the comparatively high temperature gases resulting from the combustion process pass in the opposite axial direction through the matrix. In consequence, one axial face of the regenerator matrix is exposed to comparatively cool gases whereas the opposite axial face is exposed to comparatively hot gases, such that the regenerator matrix is thermally distorted and bowed or dished slightly from the desired parallel plane condition to a concavo-convex condition, the cooler face being concave and the hotter face being convex. The problem of providing an economical gas seal between such regenerator faces and a fixed engine housing is thus rendered more difficult.

An object of the present invention is therefore to provide a new and improved regenerator sealing structure which may be disposed between the rotary surfaces of the regenerator matrix structure and the relatively stationary power plant housing within which the regenerator is rotatably mounted, as above described. More specifically, the improved sealing structure includes a comparatively flexible sealing element or sector plate disposed in sliding and sealing engagement with the rotary regenerator matrix structure on either side thereof. A resilient spacer is interposed between each sector plate and frame or housing, whereby a resiliently yieldable support is provided for the underside of the regenerator to support the same in a floating relationship, thereby to accommodate for both thermal and pressure induced distortion of the regenerator, as well as to shield the regenerator from mechanical vibration resulting for example from road shock. Each sector plate comprises a flat rim arranged coaxially with the regenerator adjacent the latter's periphery. Two flat radial arms of the sector plate extend to its rim and partition the area bounded thereby into two sectors for the counterflow of gases through the regenerator matrix. Coextensive with the sector plate and secured to the side thereof which confronts the regenerator matrix is a rubbing seal material which effects a sliding seal with the matrix.

Another object is to apply a bending moment to each sector plate at generally diametrically opposed locations, so as to bend the sector plate to the concave-convex shape corresponding approximately to the shape of the warped regenerator and to assure that the rubbing seal will lie flush with the regenerator matrix when the latter is dished or bowed as described by thermal distortion. The bending moment is applied by means of a pair of spring arms secured to the outer periphery of each sector plate at said generally diametrically opposed locations. Each spring arm of each sector plate extends axially toward the opposing spring arm of the other sector plate at locations outwardly of the periphery of the regenerator matrix, the opposing spring arms of the two sector plates overlapping and resiliently engaging each other adjacent the regenerator midplane to effect the aforesaid bending moment.

Other objects are to provide such a sealing structure which effects a resilient foundation for the sector plate or sealing element that is in sliding contact with the regenerator matrix, which enables economical installation and ready replacement of the sealing structure, and wherein the periphery of the regenerator matrix at the region of the resilient arms which apply the bending moment to the sector plates is bathed in the comparatively cool and high pressure combustion supporting air discharged from the air compressor. This comparatively cool high pressure inlet air preserves the resiliency of the bending moment arms, which are thus enabled to cooperate with the resilient spacers between the sector plates and engine housing in providing the desired resilient support for the regenerator that is otherwise impaired by reason of loss of resiliency of the spacers subject to the extreme heat of the gases flowing through the regenerator.

Further objects are to provide a power plant sealing structure of the type set forth above which may be readily and economically fabricated by known production techniques and to provide a peripheral sealing structure for use with a rotary regenerator matrix for an automotive power plant which is characterized by its improved sealing characteristics under all operating conditions of the power plant and by its relatively long operating life.

Other objects of this invention will appear in the following description and appended claims, reference being had to the accompanying drawings forming a part of this specification wherein like reference characters designate corresponding parts in the several views.

FIGURE 1 is a cross sectional assembly view of an automotive type gas turbine power plant having a rotary regenerator mechanism and incorporating the regenerator sealing structure of my instant invention.

FIGURE 2 is a transverse partial sectional view of the power plant assembly of FIGURE 1, taken in the direction of the arrows substantially along the section line 2—2 of FIGURE 1.

FIGURE 3 is a plan view of the upper sector plate and a portion of the regenerator sealing structure.

FIGURE 4 is an enlarged sectional view taken in the direction of the arrows substantially along section line 4—4 of FIGURE 3.

FIGURE 5 is a fragmentary plan view showing the lower sector plate and a portion of the regenerator sealing structure.

FIGURES 6 and 7 are fragmentary enlarged sectional views taken in the directions of the arrows substantially along the lines 6—6 and 7—7 respectively of FIGURE 5.

FIGURE 8 is an enlarged fragmentary view similar to FIGURE 1, showing details of the regenerator hub mounting.

FIGURE 9 is a fragmentary sectional view through a portion of the regenerator drive gear train.

FIGURE 10 is a fragmentary sectional view through the regenerator matrix, showing details of the resilient moment arms tending to deform the sector plate of the sealing structure so as to conform to the surface of the regenerator during operation.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring first to the assembly view of FIGURE 1, an intake air compressor rotor 10 is shown comprising a hub 11 with radially extending inducer blades 12 and working blades 13. The rotor hub 11 includes a leftward extension which is rotatably journalled in an end housing cover 14. Accessory drive gears 15 are drivably connected to the hub extension by means of a splined connection 16 with an accessory drive input gear 17. A suitable cover plate 18 may be provided for enclosing the accessory drive gears 15, said cover plate 18 being bolted to the housing cover 14 by means of bolts 19.

The end housing cover 14 defines an outwardly extending intake air passage 20 having a reverse configuration as shown. The radially inward portion of the passage 20 communicates with the air inducer passage of compressor rotor 10 within which inducer blades 12 are disposed. Upon rotation of the compressor rotor 10 about its central axis, intake air is caused to flow in a generally inward direction through the passage 20 and is then caused to pass in an axial direction through the inducer blades 12. The air is then discharged radially through the blades 13 and is collected in a substantially spiral-shaped diffuser chamber 21, said diffuser chamber 21 being defined by the power plant housing portion 22. It may be observed that the end housing portion 14 is bolted about its outer periphery by means of bolts 23 to the housing portion 22 and is effective to partly define the radially inward portion of the diffuser chamber 21.

The diffuser chamber 21 is substantially spiral in shape and it progresses about the central axis of the rotor 10 with a progressively increasing cross sectional area and terminates in a dome-shaped cavity 24 located on the upper portion of the power plant housing assembly, said cavity being defined by an upper housing cover 25 which is bolted at 26 to the housing portion 22 about its outer periphery. The cavity 24 opens directly into an upper cylindrical regenerator containing chamber 27 defined in part by a part 22c of housing 22.

As comparatively cool intake air is discharged into the diffuser chamber 21, its static pressure increases to a maximum value as it collects in cavity 24 and chamber 27. A rotary regenerator 28 in the latter chamber includes a drum-like matrix structure having a circular hub 29 and a rim 30, the hub 29 being reinforced at its upper and lower ends by cylindrical inserts 31 and 32 respectively, having upper and lower surfaces substantially flush with the upper and lower ends respectively of the hub 29, as illustrated in FIGURE 8. The insert 31 is firmly secured within hub 29 to comprise a unitary structure therewith and has a thickened upper part formed with a spherical inner surface 33 in bearing engagement with the concentric spherical outer bearing surface of a ball element 34. The latter is provided with an axial bore 35 centered with respect to the outer surface of ball 34 and comprising a cylindrical bearing surface rotatably and axially slidable on a coaxial vertical supporting shaft 36. The shaft 36 extends upward through the ball 34 and regenerator hub 29 and is secured by means of a nut 37 to an upper platform 25a of housing portion 25 and is recessed thereinto and covered by a suitable protective shield 38.

The lower end of shaft 36 projects beyond the lower end of the regenerator hub 29 and is provided with a threaded bore 39 screwed to an upwardly extending stud 40. The latter in turn is secured within a nut 41 welded to the top of an inverted channel-shaped bracket 42 extending generally diametrically below the regenerator 28 and having the lower edges of its depending sides suitably secured to an underlying supporting shelf 22a of the housing portion 22, FIGURE 1.

Below the spherical surface 33, the insert 31 comprises an annular cylindrical extension 43 which receives an annular support 44 held in position by means of a snap ring 45 partially embedded into the lower end of extension 43 immediately below support 44. The latter is also provided with an interior spherical surface concentric with the surface of ball element 34 and cooperating with surface 33 to complete a universal type bearing engagement with the ball element 34. The interior bores of inserts 31 and support 44 are appreciably larger than the diameter of shaft 36 to enable freedom of tilting or cocking of the regenerator matrix 28 about all axes perpendicular to the axis of shaft 36.

The lower insert 32 has upright cylindrical walls terminating in an upper inbent annular flange 46 to provide rigidity for the insert 32. The inner circumferential portions of the insert 32 are spaced adequately from shaft 36 so that the regenerator matrix 28 has in effect a freely floating mounting with respect to the shaft 36. The outer spherical surface of ball element 34 and its inner cylindrical surface 35 comprise suitable dry bearing surfaces such as graphite or a metallic oxide to enable both rotational and axial movement of the regenerator matrix 28, as well as the aforesaid tilting or cocking movement with respect to the shaft 36.

The regenerator rim 30 is provided with an annular groove 47 of circular cross section, FIGURE 9, which tightly receives a mating annular bead 48 integral with the inner periphery of a ring gear 49. The latter extends entirely around the regenerator rim 30 and is spaced slightly therefrom as illustrated, except at a region of snug contact between the bead 48 and base of the groove 47, to enable the axis of gear 49 to remain vertical regardless of tilting or warping of the regenerator matrix 28 or its supporting structure. Preferably during assembly of the ring gear 49, the latter is expanded by being heated to approximately 700° F. to 800° F. The gear 49 is then passed over the rim 30 until the bead 48 aligns with groove 47. As the gear 49 cools, it shrinks into place with the inner periphery of the bead 48 seating snugly against the base of groove 47 to minimize noise that would otherwise result from free play between the gear 49 and rim 30. The lower edge of gear 49 is provided with an integral projection 50 which extends into a mating notch 51 in a bracket 52 secured to rim 30, thereby to key gear to rim 30 for rotation together as a unit while enabling the adjacent sides of the rim 30 to deform during warping of the regenerator matrix 28 in the manner explained below.

The radially outwardly extending teeth of the gear 49 mesh with the teeth of a pinion gear 53 keyed to a shaft 54 for rotation therewith. The lower end of shaft 54 is journalled in a bearing block 55 having a tubular upper portion 56 terminating in an annular out-turned flange 57 which overlies a shelf or platform 25b of the housing portion 25. A window 58 is provided in tubular extension 56 at the region of the gear 53 to enable meshing engagement between the teeth of the latter and of the ring gear 49. Above the gear 53, the shaft 54 is journalled in a bearing block 59 having an annular flange 60 overlying flange 57 and secured thereto and to platform 25b by means of a plurality of bolts 61. The upper end of shaft 54 is keyed to the hub of a speed reducing gear 62 by means of a pin 63. Sealing bushings 64 and 65 respectively are interposed between gear 53 and block 59 and between block 59 and gear 62.

The peripheral teeth of speed reducing gear 62 mesh with a driving gear 66 keyed to the upper end of a vertical driveshaft 67 journalled in a bearing support 68 suitably supported by shelf 25b. The lower end of shaft 67 is operatively connected with the auxiliary gear system 15 for rotation thereby, so that rotation of compressor 10 results in simultaneous rotation of shaft 67, gears 66, 62, 53, and 49, and the regenerator matrix 28.

A support 69 is secured to the underside of platform 25b and maintained in fluid sealing engagement therewith by means of an interposed sealing gasket 70. A wall structure 71 welded to the support 69 extends to and is secured to the cylindrical housing portion 22c, so as to provide a fluid containing enlargement 27a of chamber 27 sufficient to accommodate the regenerator driving mechanism including pinion 53 and its supporting structure illustrated in FIGURE 9. Similarly to seal 70, sealing gaskets 72 and 73 are interposed between platform 25b and flange 57 and between the latter flange and flange 73, thereby to prevent undesirable loss of high pressure air from chambers 27 and 27a.

A core or body portion 75 of the regenerator matrix 28 comprises a pervious material having axially extending passages which are effective to conduct gases from one axial side thereof to the other. One typical construction comprises alternate layers of flat sheets and corrugated sheets which are wound about the hub 29 and which define the drum-like core 75. The individual sheets may be formed into an integral assembly by a suitable brazing operation, and the rim 39 may likewise be secured about the periphery of the core by a brazing operation. The alternately spaced corrugated sheets define the abovementioned axially extending passages through the core body 75.

In accordance with the structure disclosed, the comparatively cool high pressure air entering chamber 24 pervades chamber 27 and its enlargement 27a so as to maintain the ring gear 49 and its driving pinion 53 in a cool temperature environment. In consequence, lubricating of the bearing surfaces for the spindle 54 and of the intermeshing teeth of gears 49 and 53 is facilitated and wearing of the parts is minimized. The compressed intake air passes from chamber 24 in a downward direction, FIGURE 1, through the regenerator core 75 into a chamber 76 disposed in part directly below the regenerator matrix 28, FIGURE 1. By reason of the pressure drop resulting from the flow of high pressure air through the restricted axial passages of the regenerator core, the pressure in chamber 76 will be at an intermediate value, somewhat below the pressure in chambers 24 and 27. Also as will be explained more fully below, air in its downward passage through the regenerator core from chamber 24 to chamber 76 is heated by the regenerator core, and the latter in turn is cooled.

Suitable baffling 77 and a burner tube 78 are provided for conducting the heated air from chamber 76 to a region 79 surrounding a vertically disposed burner cone 80, FIGURE 2, the baffling 77 being joined to the burner tube 78 to define an enclosure about which the gases within chamber 76 are free to circulate. The air is admitted from region 79 to the interior of the burner cone 80 through a plurality of apertures 81, the air then being mixed with liquid fuel introduced by an atomizing nozzle 82 which extends into the burner cone 80. The fuel and air mixture is then ignited by a suitable igniter 83 and the composition gases are directed in a substantially downward direction through the burner tube 78. The housing for the above-described burner structure comprises a vertically disposed cylindrical extension 84 formed on one side of the power plant housing portion 22. A burner cap 85 is bolted upon the upper surface of the housing extension 84 so as to close the burner cone 80 and provide a means of access for servicing the same.

Upon reaching the lower extremity of the burner tube 78 the composition gases enter a spiral-shaped chamber 86 defined in part by the centrally situated baffling 77. The axis of spiral chamber 86 corresponds substantially to the axis of the compressor rotor 10. The chamber 86 is further partially defined by a circular baffle 87 which includes an axially extending portion disposed concentrically about the axis of rotor 10 and having a radially extending portion secured at its outer periphery in fluid sealing relationship at 88 to the housing portion 22. As the gases enter chamber 86, they pass axially through an annular passageway partly defined by a nozzle block assembly designated generally by numeral 89. The nozzle block assembly may be adapted to retain a first ring of stator blades 90 and a second ring of stator blades 91. A first stage turbine wheel 92 is situated within the nozzle block assembly 89 and its peripheral blades are disposed between stator blades 90 and 91 in adjacent relationship therewith. A first spacer element 93 and a second spacer element 94 are interposed between the turbine wheel 92 and the hub 11 of the compressor rotor 10, and a turbine shaft 95 is provided for securing the turbine wheel 92, the spacers 93 and 94 and the rotor hub 11 in axially stacked relationship to form a unitary assembly which may rotate as a unit about a common axis of rotation. A bearing 96 is provided for rotatably journalling the turbine wheel 92 and rotor assembly within a housing extension 97.

A second stage turbine wheel shown at 98 is provided with peripheral blades situated adjacent the stator blades 91 in adjacent relationship therewith. A turbine wheel spacer element 99 is held in axially stacked relationship with turbine wheel 98 by means of turbine shaft 100, and the entire assembly is rotatably journalled by means of bearing 101 in an apertured wall portion 102 of the housing portion 22.

The wall portion 102 is adapted to define an enclosure 103 within which a speed reduction transmission mechanism 104 is disposed, said transmission mechanism comprising an input gear assembly 105 drivably connected to the turbine shaft 100 and a power output shaft 106 situated in a lower portion of the enclosure 103. The power output shaft 106 may be conveniently coupled to a vehicle driveshaft for a conventional automotive vehicle and it is drivably connected at its inner portion to the input gear 105 by intermediate gears 107, 108, and 109.

The combustion gases pass from the chamber 86 through the annular passageway defined by the nozzle block assembly 89 and into an exhaust chamber 110 disposed below the regenerator matrix structure 28. The exhaust gases may then pass from the chamber 110 through the axially extending passages in the regenerator core to heat the latter, then into a dome-like exhaust chamber 111 defined by the power plant housing cover 25. A suitable exhaust conduit may be provided for conducting the exhaust gases from the chamber 111 to an external opening. In passing through the regenerator matrix, the gases are cooled in the process of heating the regenerator core. Also the pressure drop across the latter reduces the pressure of the gases in chamber 111 to slightly above atmospheric pressure.

The low pressure gases in exhaust chamber 110 are separated from the intermediate pressure gases in chamber 76 by wall structure 112 of housing portion 22, said wall structure further providing a means for supporting the aforementioned nozzle block assembly 89 in a central position within the power plant housing portion 22. The regenerator matrix core 75 is exposed to the chamber 76 through a sector-shaped opening identified in FIGURES 1, 3, and 5 as an intermediate pressure area 113. The regenerator matrix core 75 is exposed to the exhaust chamber 110 at an opening designated herein as a low pressure area 114, FIGURES 1, 3, and 5. The openings or areas 113 and 114 are also partly defined by platform 22a, integral with wall 112, and channel support 42 which extend radially in opposite directions from shaft 36. The radially outer ends of platform 22a are joined to the vertical cylindrical wall 22c which defines chamber 27. Similarly the radially outer ends of channel support 42 are joined to a cylindrical vertical housing wall 115 coaxial with and secured to housing portion 22c and having an upper annular horizontal inturned flange 116 flush with the top of support 42. The latter and flange 116 carry the weight of the regenerator matrix 28 as explained below.

The housing cover 25 is similarly provided with a sector defining portion 117 through which shaft 36 extends, FIGURE 8. The portion 117 extends radially from shaft 36 in opposite directions coextensively with the top of support 42 and is connected at its radially outer ends with an approximately semi-circular inturned flange 118 of housing cover 25. The flange 118 defines the outer semi-circular boundary of low pressure area 114 above the regenerator matrix 28 and is also substantially coextensive with an underlying semi-circular portion of flange 116 which defines the outer semi-circular boundary of area 114 below the regenerator matrix 28.

In order to support the regenerator matrix 28 and to assure the desired flow of gases therethrough, upper and lower seals 119 and 120 are provided entirely around the area 114 between the upper and lower faces of the drum-like regenerator matrix and juxtaposed portions of the engine housing defined by the peripheral flanges 118 and 116, the sector arm 117 and the top of support 42. A substantially semi-circular seal 120a is provided between the periphery of the lower face of the regenerator matrix 28, the juxtaposed portion of peripheral flange 116 which bounds the semi-circular periphery of area 113. The latter seal merges with the peripheral portions of seal 120, and in cooperation with the diametrically extending portion of seal 120 overlying the top of support 42, completely encloses the area 113.

The seals 119, 120, and 120a include upper and lower annular sector plates 121 and 122 having substantially diametrically extending integral cross arms 123 and 124 respectively defining the areas 113 and 114, FIGURES 3 and 5. The central portions of the cross arms 123 and 124 are enlarged to provide hubs containing apertures 125 and 126 respectively for coaxial passage of shaft 36 freely therethrough. The axially outer surfaces of the sector plates 121 and 122 comprise thin flexible sheet metal stampings or back-up plates 127 and 128 respectively of material such as stainless steel. Bonded to the axially inner surfaces of the back-up plates 127 and 128 are rubbing seals 129 and 130 respectively of graphite or suitable material such as a metallic oxide adapted to withstand the high temperature of the gases flowing through the regenerator matrix. The rubbing seals 129 and 130 lie flush with the upper and lower peripheral surfaces of the regenerator matrix 28 in fluid sealing sliding relationship therewith to prevent radial flow of gases between the juxtaposed surfaces of the regenerator core 75 and the respective rubbing seal 129 or 130.

The seal 119 also comprises a channel-shaped spacer 131 of resilient sheet material, FIGURES 3 and 4, which extends entirely around the low pressure area 114 and opens radially outwardly from that area. The spacer 131 comprises upper and lower channel sides 131a and 131b, the latter having its radially outer portion extending flush with the upper surface of backing plate 127 and being welded thereto at 132 to effect a fluid tight seam entirely around the periphery of the area 113. The radially inner portion of the channel side 131b extends inwardly toward the area 113 and axially upwardly and is welded at 133 to a parallel flange of the radially inner edge of the channel side 131a. Also formed in the channel side 131a is a sealing channel 134 which extends entirely around the area 114 and opens downwardly toward the opposite channel side 131b. The channel 134 is dimensioned to fit snugly within a coextensive resilient clamping channel 135 comprising a sheet metal stamping having a flange 136 extending radially inwardly from the mouth of the channel 135. The flange 136 extends in juxtaposition with the channel side 131a, then extends upwardly and inwardly at 137 adjacent the underside of the continuous coplanar surfaces of housing cross arm 117 and peripheral flange 118, to which it is secured by a clamp 138 and a plurality of bolts 139, the clamp 138 extending entirely around the area 114. A suitable insulating gasket 140 may be provided between the surface of the clamping flange 137 and the housing portions 117 and 118. Inwardly with respect to the area 114, the clamping flange 137 extends upwardly as a flange 141 which cooperates with an interior panel 142 lining chamber 111. The panel 142 is secured in place by a plurality of bolts 143 and retains a suitable insulating lining material 140a in position around the entire interior surface of chamber 111.

Similarly to seal 119, the seal 120 includes a lower channel-shaped resilient spacer 144 extending entirely around the area 114 below the regenerator matrix 28 and opening radially outwardly from that area. The spacer 144 is formed from lower and upper sheet metal channel sides 144a and 144b, the latter having its radially outer portion flush with the underside of back-up plate 128 and welded thereto at 145 to complete a fluid tight seal entirely around the area 114. Also similarly to the channel sides 131a and 131b, the inner edges of the channel sides 144a and 144b curve downwardly in parallelism with each other and are welded together at 146. Adjacent the mouth of the spacer 144, the channel side 144a is formed with a resilient sealing channel 147 which extends entirely around the area 114 in the manner of sealing channel 134. A resilient clamping channel 148 coextensive with the channel 147 receives the latter in fluid sealing relationship, FIGURE 8, and is provided with a flange 149 which extends from the mouth of channel 148 in the direction toward area 114. The flange 149 extends generally parallel to the top of housing portion 42, then extends toward the latter at 150 and is welded thereto and to the coplanar flange 116 at 151 to effect a fluid tight seal entirely around the area 114.

Seal 120a comprises a second resilient channel-shaped spacer 152 underlying the entire length of the peripheral portion of sector plate 122 which bounds area 113, FIGURES 5 and 6. The channel spacer 152 opens radially outwardly from the intermediate pressure area 113 and comprises lower and upper channel sides 152a and 152b having juxtaposed downturned inner flanges welded together at 153 along the entire length of the spacer 152. The radially outer portion of channel side 152b lies flush with the underlying portion of housing flange 116 and is under resilient tension yieldingly maintaining itself in fluid sealing relationship with the latter flange. The radially outer edge of the upper channel side 152b is welded at 154 along the entire length of the seal to the underside of plate 128. As illustrated in FIGURE 7, the end portions of the channel spacer 152 extend into the channel spacer 144, both channels 144 and 152 opening in the same direction. At the region of overlap between the channels 144 and 152, the channel side 152a is resiliently urged against the channel side 144a in fluid sealing relationship and the radially outer edge of channel side 152b underlies and is welded to the interior surface of channel side 144b, thereby to provide a leak-proof juncture between the two seals.

In accordance with the foregoing, it is apparent that air entering chamber 24 from compressor 10 is free to circulate entirely around the outer periphery of the regenerator matrix 28 within chamber 27 and the latter's extension 27a, thereby to bathe the regenerator and its driving mechanism in the comparatively cool high pressure air flow as aforesaid. The upper seal 119 prevents the high pressure air in chambers 24 and 27 from bypassing the regenerator 28 and entering the area 114 or exhaust chamber 111. Likewise the lower seal 120 prevents the high pressure gases in chamber 27 and the intermediate pressure gases in chamber 76 from entering the area 114 except in accordance with the desired flow path from chamber 110. The seal 120a around the outer periphery of sector plate 122, which bounds the intermediate pressure area 113, prevents the high pressure air in chamber 27 from bypassing the regenerator and entering the latter area or chamber 76 directly from chamber 27.

In consequence, the high pressure air in chamber 24 is directed axially downward through the portion of the regenerator core 75 within the area 113 and into the intermediate pressure chamber 76. This high pressure air is heated in its passage through the regenerator core 75. The exhaust gases from chamber 110 are similarly directed axially upward through the portion of the regenerator core 75, which is bound by the low pressure area 114 and into the exhaust chamber 111. It is to be noted in the above regard, that the comparatively high pressure in chamber 27 enters the open channel mouth of the channel-shaped spacers 144 and 152 so as to assist the inherent resiliency of these channels in supporting the weight of the regenerator matrix 28. Similarly the gases at the intermediate pressure in chamber 76 enter the channel 144 along the extent of the sector cross arm 124 between the ends of channel spacer 152. In this latter regard, the channel spacers 144 and 152 are under resilient tension tending to separate their respective channel sides. Accordingly the regenerator matrix 28 is supported in floating relationship entirely by the resiliency of the channel-shaped portions of the bottom sealing structures and the pressure of the air assisting vertical separation of the sides of these channels.

By reason of the pressure differential acting generally diametrically across the regenerator matrix 28 between areas 113 and 114, and further in consequence of the constantly changing temperature distribution in the regenerator core 75, the latter tends to warp upwardly at its peripheral edges with respect to its central axis. This warping is non-uniform around the periphery of the regenerator matrix 28 because of the asymmetric distribution of both the temperature and pressure. The sector plates 121 and 122 are therefore preferably as flexible as possible within the limits required by their structural and sealing characteristics so as to optimize the sealing engagement between the rubbing seals 129 and 130 and the adjacent peripheral surfaces of the regenerator matrix 28. In order to assure maximum conformity between the upper and lower peripheral surfaces of the regenerator matrix 28 and the mating sealing surfaces of the rubbing seals 129 and 130, a suitable bending moment is applied at diametrically opposite sides of the sector plates 121 and 122.

As illustrated in FIGURE 10, the sector plate 121 is provided with a pair of substantially diametrically opposed tabs 155 at opposite ends of the cross arm 123.

Each tab 155 comprises coextensive projections of the backing plate 127 and rubbing seal 129. Similarly, the lower sector plate 122 is provided with diametrically opposite tabs 156 comprising coextensive extensions of the back-up plate 128 and rubbing seal 130 directly underlying the tabs 155. Two pairs of resilient moment arms 157 and 158 are associated with the tabs 155 and 156 respectively, the upper moment arms 157 having radially inwardly directed upper flanges 159 overlying and welded to the upper surfaces of the tabs, the lower ends of the moment arms 158 terminating in radial flanges 160 underlying and welded to the tabs 156.

From the ends 159 and 160, the arms 157 and 158 extend toward each other, each arm 157 terminating in a rounded terminal portion 161 overlapping a rounded terminal portion 162 of the associated arm 158. Both pairs of arms 157 and 158 are secured to their respective tabs 155 and 156 under tension so that the arms 157 yieldingly urge the arms 158 radially inwardly, which movement is oppposed by the resiliency of the arms 158 urging the arms 157 radially outwardly. In consequence of the arms 157 and 158 arranged as described at diametrically opposite ends of the sector plates 121 and 122, a moment of bending force is applied to each sector plate tending to bow these plates upwardly at the opposite ends of the cross arms 123 and 124. Because of the annular shape of the outer peripheries of the sector plates 121 and 122, these plates are dished conically by the moments of a force so as to conform closely to the resulting shape of the conically warped regenerator matrix 28 during operation of the engine.

Also by virtue of the location of the arms 157 and 158 and the tabs 155 and 156 in the region of the comparatively cool air of chamber 27, these arms retain their resiliency during operation of the engine and supplement the resiliency of the spring material of the spacers 131, 144, and 152 and the associated clamping channels 133 and 148 particularly in regard to the spacers and clamping channels at the hotter underside of the regenerator matrix 28, so as to maintain sealing contact between the rubbing seals 129 and 130 and the adjacent surfaces of the regenerator. During operation of the engine the aforesaid spacers and channel clamps at the underside of the regenerator tend to lose their resiliency in the extremely high temperature environment to which they are subjected, whereby their ability to maintain the rubbing seals 129 and 130 in contact with the regenerator core 75 is thus impaired.

I claim:

1. In an apparatus having a regenerator adapted for passage of separate streams of gases through opposed surfaces of said regenerator, means for effecting a seal between said separate streams of gases including a pair of resilient spaced sector plates adapted to engage said opposed surfaces respectively in fluid sealing relationship, each sector plate having an annular rim and a generally diametrically extending cross arm partitioning the area bounded by said rim into two sectors for passage of said gases therethrough, and means for bending said sector plates to concavo-convex shapes comprising a pair of resilient moment arms secured to the rim of each sector plate at diametrically opposed locations adjacent the opposite ends of said cross arm, each moment arm of each sector plate extending toward a corresponding moment arm of the other sector plate and resiliently engaging the latter arm at a location between said spaced sector plates in mutual force exerting relationship.

2. In an apparatus having a rotary regenerator, said regenerator having axially opposed surfaces and being adapted for axial flow of separate streams of gases therethrough, means for effecting a seal between said separate streams of gases including a pair of resilient axially spaced sector plates adapted to engage said axially opposed surfaces of said regenerator in fluid sealing relationship, each sector plate having a circularly extending rim portion, and means for bending said sector plates to concavo-convex shapes comprising a plurality of resilient moment arms secured to the rim portion of each sector plate at circumferentially spaced locations, each moment arm of each sector plate extending axially toward a corresponding moment arm of the other sector plate and resiliently engaging the latter arm at a location between the axially spaced sector plates in mutual force exerting relationship.

3. In combination, a regenerator for a gas turbine engine having a surface adapted for passage of separate streams of gases therethrough, means for effecting a seal between said gases including a sector plate engaging said surface in fluid sealing relationship and having a circularly extending rim portion, means for bending said sector plate to a concavo-convex shape comprising a plurality of resilient moment arms secured to said rim portion at circumferentially spaced locations, each moment arm extending axially from said rim portion, and means for applying radially directed for to each moment arm at a location spaced axially from said rim portion.

4. In combination, a rotary regenerator for a gas turbine engine having an axial end surface and being adapted for axial passage of separate streams of gases therethrough, means for effecting a seal between said gases including a sector plate engaging said end surface of said regenerator in fluid sealing relationship and having a circularly extending rim portion, means for bending said sector plate to a concavo-convex shape comprising a pair of resilient moment arms secured to said rim portion at generally diametrically opposed locations, each moment arm extending axially from said rim portion, and means for applying radially directed force to each moment arm at a location spaced axially from said rim portion.

5. In combination, a regenerator for a gas turbine engine having an axial end surface and being adapted for axial passage of separate streams of gases therethrough, means for effecting a seal between said gases including a sector plate engaging said end surface in fluid sealing relationship and having a circularly extending rim, said rim having a plurality of radially outwardly extending tabs spaced about its circumference, a separate resilient moment arm secured to each tab, each moment arm extending axially from said rim to apply a bending moment thereto upon application of a radially directed force to said arm at a location spaced axially from said rim.

6. In combination, a regenerator for a gas turbine engine having an axial end surface and being adapted for axial passage of separate streams of gases therethrough, means for effecting a seal between said gases including a sector plate engaging said end surface of said regenerator in fluid sealing relationship and having a circularly extending rim, said rim having a pair of radially outwardly extending diametrically opposed tabs, a separate resilient moment arm secured to each tab, each moment arm extending axially from said rim to apply a bending moment thereto upon application of a radially directed force to said arm at a location spaced axially from said rim.

7. In combination, a rotatable counterflow type regenerator for a gas turbine engine, said regenerator having end faces spaced axially of its axis of rotation and comprising a matrix arranged for axial flow of separate streams of gases therethrough, means for effecting a seal between said separate streams of gases including a resilient sector plate arranged in fluid sealing relationship with each of said opposite end faces, each sector plate comprising an annular rim coaxial with said matrix and a pair of radially extending sector arms partitioning the area bounded by said rim into two sectors for the passage of said gases therethrough, and means for bending said sector plates to concavo-convex shapes comprising a plurality of resilient moment arms secured to said rims, each moment arm of each sector plate extending axially toward a corresponding moment arm of the other sector plate at a region radially outward of said regenerator and resiliently engaging the latter moment arm in mutual radially directed force exerting relationship.

8. The combination according to claim 7 comprising means for exposing one end face of said matrix to comparatively hot gases and the other face of said matrix to relatively cooler gases, and wherein the radially directed force applied to the moment arms secured to the sector plate at said one end face is directed radially inwardly, the corresponding force applied to the other moment arms being directed radially outwardly.

9. The combination according to claim 8, including means for bathing the outer periphery of said regenerator and said moment arms in said relatively cooler gases.

10. The combination according to claim 7 wherein the rim of each sector plate includes a plurality of radially outwardly extending tabs, and the attachment between said moment arms and rim is adjacent the radially outer ends of said tabs.

References Cited by the Examiner

UNITED STATES PATENTS

| | | | |
|---|---|---|---|
| 2,789,793 | 4/57 | Theoclitus | 165—9 |
| 2,880,972 | 4/59 | Williams | 165—9 |

CHARLES SUKALO, *Primary Examiner.*

HERBERT L. MARTIN, *Examiner.*